(12) United States Patent
Woods et al.

(10) Patent No.: US 9,666,233 B2
(45) Date of Patent: May 30, 2017

(54) EFFICIENT VIDEO FRAME RENDERING IN COMPLIANCE WITH CROSS-ORIGIN RESOURCE RESTRICTIONS

(71) Applicant: GoPro, Inc., San Mateo, CA (US)

(72) Inventors: Kevin Woods, Mountain View, CA (US); Jane Sternbach, San Francisco, CA (US); Joshua Edward Bodinet, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 72 days.

(21) Appl. No.: 14/727,445

(22) Filed: Jun. 1, 2015

(65) Prior Publication Data

US 2016/0351231 A1    Dec. 1, 2016

(51) Int. Cl.
| | | |
|---|---|---|
| *G11B 27/00* | (2006.01) | |
| *H04N 5/93* | (2006.01) | |
| *H04N 5/765* | (2006.01) | |
| *H04N 9/80* | (2006.01) | |
| *G11B 27/28* | (2006.01) | |
| *H04N 19/40* | (2014.01) | |
| *G11B 27/031* | (2006.01) | |
| *G11B 27/10* | (2006.01) | |
| *H04N 19/593* | (2014.01) | |
| *G11B 27/32* | (2006.01) | |

(52) U.S. Cl.
CPC ............ *G11B 27/28* (2013.01); *G11B 27/031* (2013.01); *G11B 27/102* (2013.01); *G11B 27/326* (2013.01); *H04N 19/40* (2014.11); *H04N 19/593* (2014.11)

(58) Field of Classification Search
USPC .................................. 386/239–248, 278–290
See application file for complete search history.

(56) References Cited

U.S. PATENT DOCUMENTS

| | | | | |
|---|---|---|---|---|
| 2002/0165721 A1* | 11/2002 | Chang | ..................... | G10L 19/00 704/503 |
| 2004/0001706 A1* | 1/2004 | Jung | ................. | G06F 17/30056 386/243 |
| 2008/0183843 A1* | 7/2008 | Gavin | .................... | G06Q 30/06 709/217 |
| 2010/0274714 A1* | 10/2010 | Sims | ................. | G06F 17/30017 705/40 |

(Continued)

*Primary Examiner* — Hung Dang
(74) *Attorney, Agent, or Firm* — Sheppard Mullin Richter & Hampton LLP

(57) ABSTRACT

A browser efficiently extracts media from a video presented through a web application having a different domain from a media server providing the web application while complying with cross-origin resource restrictions. A video portion is selected, and a header portion of the video is identified. A truncated video portion, which includes the selected video portion and a video portion contiguous to the selected video portion, is loaded into memory. A truncated video file is generated including the truncated video portion and a truncated video header. The truncated video file is encoded as a video tag included in the web application, and the media corresponding to the selected video portion is extracted by transcoding the truncated video file in the video tag. A server may also extract the media by loading the truncated video portion, generating the truncated video file, and transcoding the truncated video file to obtain the media.

20 Claims, 7 Drawing Sheets

(56) References Cited

U.S. PATENT DOCUMENTS

| | | | |
|---|---|---|---|
| 2012/0210205 A1* | 8/2012 | Sherwood | G06F 17/30058 715/234 |
| 2015/0113009 A1* | 4/2015 | Zhou | G06F 17/30076 707/755 |
| 2016/0094601 A1* | 3/2016 | Besehanic | H04L 67/32 709/219 |

\* cited by examiner

EFFICIENT VIDEO FRAME RENDERING IN COMPLIANCE WITH CROSS-ORIGIN RESOURCE RESTRICTIONS

BACKGROUND

Field of Art

The subject matter described generally relates to media in a networked computing environment and in particular to efficiently rendering video frames in compliance with a cross-origin resource sharing security policy.

Description of the Related Art

High definition video, high frame rate video, or video that is both high definition and high frame rate (collectively referred to herein as "HDHF video") can consume significant computing resources. For example, storing HDHF video occupies a large amount of computing memory, and transferring HDHF video consumes a large amount of transmission bandwidth. Furthermore, unedited HDHF video may include only a small percentage of video that is relevant to a user. Editing the HFHF video to remove irrelevant portions may consume a large amount of computing resources (e.g., processing operations, memory, transmission bandwidth).

While editing videos, users typically select video portions to share with others. To output the shareable media, transcoding is used to extract video portions such as an image at a particular time within a video, an audio clip during a particular time range within the video, or a video clip within a particular video time range. However, conventional transcoding processes load the entire video file into memory, so conventional transcoding processes consume significant resources when working with HDHF video files (e.g., a 4 GB file). Performing such transcoding at a user's client device may be untenable due to the video file size exceeding memory available to a transcoding operation. Similarly, performing such transcoding at a server device may still be disadvantageous because of the processing resources consumed, particularly when performing transcoding for thousands of videos simultaneously.

Browsers executing web applications and applications enforce cross-origin resource restrictions, which prevent the browser from retrieving resources (e.g., videos, images, animations, audio) from a different domain than the web application. Because HDHF videos are often large, they may be stored at a separate domain of a web service provider (e.g., cloud storage, a content distribution network). Techniques to serve resources having different domains in compliance with cross-origin policies may introduce performance issues or may be infeasible with HDHF videos. For example, edited video portions may be proxied to the user from a content distribution network through a server having a domain name that complies with cross-origin resource restrictions, but such proxying increases latency and reduces responsiveness, particularly when editing HDHF videos.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION OF THE INVENTION

Figure 1:
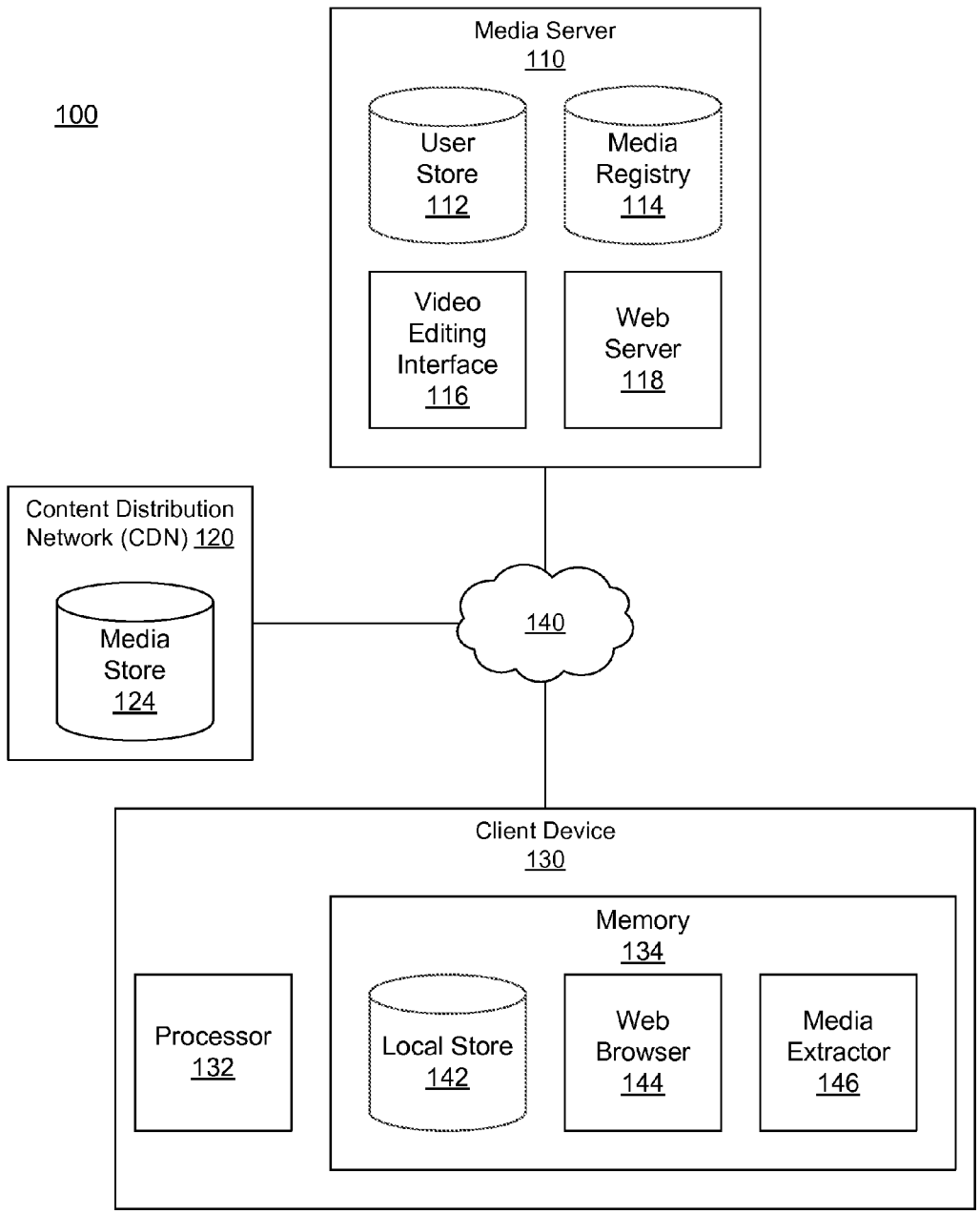
FIG. 1 is a block diagram of an environment and architecture for video editing and viewing, according to one example embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments include a system (and method and computer readable storage medium having instructions) that extracts media from a portion of a video. The system presents the video through a web application accessed by a browser of a client device. The video is obtained from a video source that has a different domain from a media server providing the web application accessed by the browser. The system receives a selection of a video portion of the video and identifies a header portion from a video file comprising the video. The header portion indicates index values within the video file of frames within the video. The system loads a truncated video portion into memory allocated to executing the browser. The truncated video portion includes the selected video portion and a portion of the video contiguous to the selected video portion. The system generates a truncated video file comprising the truncated video portion and a truncated video header indicating index values within the truncated video file of frames within the video. The truncated video file is encoded in a video tag included in the web application. The system generates the media corresponding to the selected video portion by transcoding the media from the truncated video file in the video tag.

Additional aspects disclosed include a system to extract media from a portion of a video. The system obtains a subset of the video file from a file index range conventionally including a header portion, where the video file is stored in a video source. The header portion indicates index values within the video file of frames within the video. The system identifies the header portion from the subset of the video file by searching for a label declaring the header portion. The system determines, by parsing the header portion, a video index range corresponding to a truncated video portion including the selected video portion and the portion of the video contiguous to the selected video portion. The system loads the truncated video portion by retrieving the video portion from the video source using the video index range. The truncated video portion includes the selected video portion. The system generates a truncated video header indicating index values within the truncated video file of frames within the video by re-indexing references to i-frames included in the truncated video portion. The system generates a truncated video file comprising the truncated video portion and the truncated video header. The system also generates the media corresponding to the selected video portion by transcoding the media from the truncated video file in the video tag.

Example Environment

FIG. 1 is a block diagram of a computing environment 100 and architecture for video editing and viewing, according to one example embodiment. The devices of the environment 100 include a media server 110, a content distribution network (CDN) 120, and a client device 130, which are communicatively coupled by a network 140. In alternative configurations, the environment 100 may include different and/or additional components. For example, the environment 100 includes a camera or camera docking station communicatively coupled to the client device 130. Although not shown in FIG. 1, the environment 100 may include a plurality of any of the entities or any other devices.

The media server 110 provides a portal for users to access and edit videos using client devices 130. The media server 110 may include a viewing interface to provide client devices 130 with access to videos. The media server 110 may also include an editing interface for client devices 130 to upload and modify videos. In one embodiment, the client device 130 requests a video, and the media server 110 instructs the client device 130 to retrieve the video from the CDN 110. Similarly, edits requested by the client device 130 may be applied to copies of the video served by the CDN 110. Through the media server 110, a user of a client device may manage videos associated with the user's profile on the media server. Managing videos includes sharing videos, modifying video access permissions, removing videos, and editing videos, for example. The media server 110 may be one or more servers or computing devices located at one or more data centers. Alternatively or additionally, the media server 110 incorporates one or more cloud services through one or more physical or virtual servers provided by a cloud computing service.

The content distribution network (CDN) 120 stores videos accessed through the media server 110. Typically, the CDN 120 includes geographically dispersed servers, which beneficially reduce latency and time to load videos. A cloud service provider may provide the CDN 120. The CDN 120 may have a different domain from the media server 110, particularly when the CDN 120 is provided by a cloud service provider.

A domain is a portion of a uniform resource identifier (URI) used to identify a realm of administrative control on the Internet. A domain name system (DNS) server can map a domain to a corresponding Internet Protocol (IP) address. In a URI such as a uniform resource locator (URL), the domain follows the URI scheme name (e.g., HTTP (Hypertext Transport Protocol), https (HTTP Secure)). Storing videos on a CDN 120 with a different domain from the media server 110 introduces constraints on web pages provided by the media server 110. In particular, the different domains of the CDN 120 and the media server 110 have different origins due to their differing domains, so the media server 110 generates web pages that comply with cross-origin resource sharing policies. May web browsers prevent cross-origin resource sharing, where a web page accesses a resource with a different origin than the web page.

A user can interact with interfaces provided by the media server 110 and videos stored by the CDN 120 via the client device 130. It is noted that the user may interact with the interfaces through a user account that provides the authorizations necessary for the user to access the interfaces via the client device 130. The client device 130 is any computing device capable of receiving user inputs as well as transmitting and/or receiving data via the network 140. In one embodiment, the client device 130 is a conventional computer system, such as a desktop or a laptop computer. Alternatively, the client device 130 may be a device having computer functionality, such as a smartphone, a camera, a tablet, a mobile telephone, a personal digital assistant (PDA), or another suitable device. One or more input devices associated with the client device 130 receive input from the user. For example, the client device 130 can include a touch-sensitive display, a gesture-sensitive display, a keyboard, a trackpad, a mouse, or a voice recognition system.

In one embodiment, the client device 130 includes a web browser to access a web application provided by the media server 110. The client device 130 requests to view a video, the media server 120 instructs the client device 130 to retrieve videos stored at the CDN 120, and the retrieved videos may subsequently be edited through the client device 130. One example editing operation is selecting a portion of a video and outputting a separate media file including the selected portion. For example, the output media is a thumbnail image, a video clip, or a series of video clips from one or more videos. In some embodiments, the client device 130 performs the extraction and uploads the resulting media to the media server 110 and/or CDN 120. In some embodiments, the client device 130 indicates the selected video portion and desired output media format to the media server 110, which extracts the media as directed.

The media server 110, the CDN 120, and the client device 130 communicate with each other via the network 140, which may include any combination of local area and/or wide area networks, using both wired (e.g., T1, optical, cable, DSL) and/or wireless communication systems (e.g., WiFi, mobile). In one embodiment, the network 140 uses standard communications technologies, protocols, and/or encryption.

Example Architecture

The media server 110 includes a user store 112, a media registry 114, a video editing interface 116, and a web server 118. In other embodiments, the media server 110 may include additional, fewer, or different components for performing the functionalities described herein. For example, the user store 112 is omitted. Conventional components such as network interfaces, security functions, load balancers, failover servers, management and network operations consoles are not shown so as to not obscure the details of the system architecture.

The user store 112 stores account information provided by users. A user account includes information provided by the user (such as biographic information, geographic information, and the like) and may also include additional information inferred by the media server 110 (such as information associated with a user's activity on the media server 110). Examples of user information include a username, a first and last name, contact information, a user's hometown or geographic region, or other location information associated with the user. The user store 112 may list videos uploaded by a user, including a unique identifier of the videos and video privacy and access permissions selected by the user for the videos.

The media registry 114 includes records of videos, images, and other media uploaded by users. In one embodiment, the media records are indexed according to unique identifiers generated for each video. A media record in the media registry 114 includes one or more references (e.g., URLs) to the media stored on the CDN 120. The media registry 114 may also include access preferences configured by the media's owner and associated media attributes and metadata. For example, the media metadata include metadata used to filter videos in the viewing interface. Examples of metadata used for filtering include type of equipment used by the user (e.g., ski equipment, snowboard equipment, mountain bike equipment, scuba diving equipment, etc.), type of activity being performed by the user while the video was captured (e.g., skiing, snowboarding, mountain biking, scuba diving, etc.), the time and data at which the media was captured, or a type of device used to capture or create the media.

The video editing interface 116 allows a user to browse and edit media. The media server 110 provides the video editing interface 116 as a web application that retrieves videos from the media store 124 of the CDN 120. The video editing interface 116 may also support accessing a video in local store 142 on the client device 130. For example, the user edits a requested from the media server 110 on a smart phone client device 130. In one embodiment, the user selects a portion of a video to extract and generate a media file from the selected portion. In one embodiment, the client device 130 generates the media with the media extractor 146 and uploads the media to the media server 110. Alternatively or additionally, the video editing interface 116 translates the edits into an edit decision list describing the edits selected by the user and extracts the media using a media extractor 146 on the media server 110. The edit decision list encodes a series of flags (or sequencing files) that describe tasks to generate the edited video. For example, the edit decision list identifies portions of video and the types of edits performed on the identified portions.

Editing a video can include specifying video sequences, scenes, or portions of the video ("portions" collectively herein), indicating an order of the identified video portions, applying one or more effects to one or more of the portions (e.g., a blur effect, a filter effect, a change in frame rate to create a time-lapse or slow motion effect, any other suitable video editing effect), selecting one or more sound effects to play with the video portions (e.g., a song or other audio track, a volume level of audio), or applying any other suitable editing effect. Although editing is described herein as performed by a user of the client device, editing can also be performed automatically (e.g., by a video editing algorithm or template at the media server 110) or manually by a video editor (such as an editor-for-hire associated with the media server 110). In some embodiments, the editor-for-hire may access the video only if the user who captured the video configures an appropriate access permission.

The web server 118 provides a communicative interface between the media server 110 and other entities of the environment of FIG. 1. The web server serves web pages, as well as other content, such as JAVASCRIPT, FLASH, XML (extensible markup language), and so forth. The web server 118 may receive requests to view a video and requests to edit a video (e.g., edit decision lists) from the client device 130. The web server 118 communicates instructions from the video editing interface 116 to for presenting videos and generating the video edit interface in the web browser 144 of the client device 130. Additionally, the web server 118 may provide application programming interface (API) functionality to send data directly to an application native to a client device's operating system.

The CDN 120 includes a media store 124. Conventional components such as network interfaces, security functions, load balancers, failover servers, management and network operations consoles are not shown so as to not obscure the details of the system architecture.

The media store 124 stores media created or captured by users of the media server 130. When uploading media, the client device 130 sends metadata describing the media to the media registry 114 of the media server 110 and uploads the media to the media store of the CDN 120. The client device 130 may upload the media to the CDN 120 directly or indirectly (e.g., through a temporary storage of the media server 110). In embodiments where the CDN 120 is provided by geographically distributed data centers and/or cloud service providers, media in the media store 124 may be duplicated in whole or in part across different data centers. For example, a client device 130 uploads the media to a server at a geographically proximate data center, and the media is subsequently duplicated to other servers at other data centers of the CDN. The media store 124 may store metadata (described with respect to the media registry 114) associated with media.

The client device 130 includes a processor 132 and a memory 134. Conventional components, such as power sources (e.g., batteries, power adapters) and network interfaces (e.g., micro USB port, an Ethernet port, a Wi-Fi antenna, a Bluetooth antenna, or supporting electronic circuitry), are not shown to so as to not obscure the details of the system architecture.

The processor 132 includes one or more computational nodes, such as a central processing unit (CPU), a core of a multi-core CPU, a graphics processing unit (GPU), a microcontroller, an application-specific integrated circuit (ASIC), a field programmable gate array (FPGA), or other processing device such as a microcontroller or state machine.

The memory 134 includes one or more computer-readable media such as non-volatile memory (e.g., flash memory) and/or volatile memory (e.g., dynamic random access memory (DRAM)). The memory 134 stores instructions (e.g., computer program code) executable by the processor 132 to provide the client device functionality described herein. The memory 134 includes instructions for modules. The modules in FIG. 1 include a local store 142, a web browser 144, and a media extractor 146. In other embodiments, the media server 110 may include additional, fewer, or different components for performing the functionalities described herein. Conventional components such as an operating system or input/output modules (e.g., to manage communication with the network 140, with input devices, and with display devices) are not illustrated to avoid obscuring the details of the architecture.

The local store 142 stores media locally on the client device 130. Example media stored in the local store 142 includes videos transferred from a communicatively coupled camera, videos created by a user through an editing interface, or videos downloaded from the media store 124 and cached for user viewing. The local store 142 may also include metadata input by a user through the client device 130 or retrieved from the media registry 114.

The web browser 144 includes instructions for presenting media, web pages, and web applications retrieved from the media server 110 and CDN 120. For example, the web browser 144 includes instructions for rendering web pages described by HTML (Hypertext Markup Language), XML, JSON (JAVASCRIPT Object Notation), or a combination thereof. The web browser 144 may include plug-ins or applets to provide additional interface functionality. In one embodiment, the web browser 144 renders the video editing interface 116. As an alternative to the web browser, the client device 130 may include a native application providing similar functionality using an API of the media server 110.

The media extractor 146 receives a selection of a video portion and generates media corresponding to the selected video portion. For example, if the selected video portion is a video frame, then the extracted media is a separate image file depicting the content of the selected video frame. As another example, if the selected video portion is one or more video clips, then the extracted media is a video file comprising the video frames in the selected video clips (and omitting other material from the video). The media extractor 146 extracts the media in compliance with a cross-origin policy enforced by the web browser 144. The media extractor 146 is described in further detail with respect to FIG. 3.

Example Video File

Figure 2:
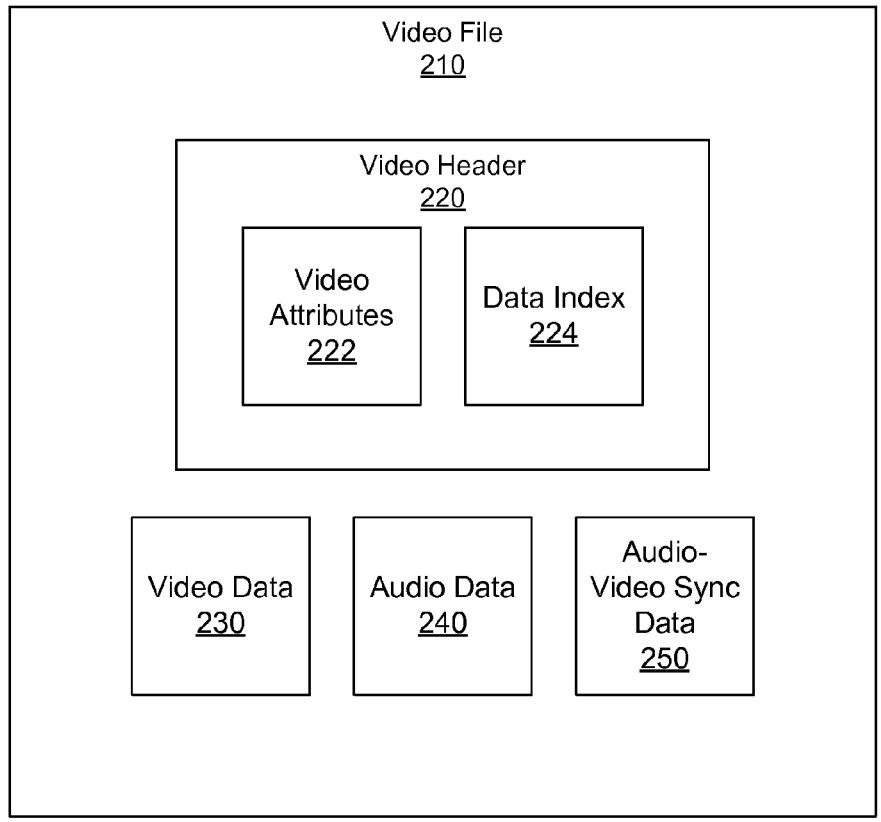
FIG. 2 is a block diagram representation of a video file, according to one example embodiment.

FIG. 2 is a block diagram representation of a video file 210, according to one example embodiment. As used herein, media typically refers to an audio and/or visual representation of information such as an image, a video, an animation, or audio. A video refers to a sequence of video frames (images) represented digitally, which may include audio synchronized to the video frames. A video file 210 is a digital representation of the video. The illustrated video file 210 includes a video header 220, video data 230, audio data 240, and audio-video sync (synchronization) data 250. Other video files 210 may contain fewer components (e.g., omitting the audio data 240 or audio-video synchronization data 250) or may contain additional components (e.g., closed caption text). Example video file formats include MP4 (and other MPEG-4 file types), AVI (audio video interleave), and MOV (QUICKTIME file format).

In one embodiment, the video file 210 comprises atoms such as the video header 220, video data 230, audio data 240, and audio-video sync data 250. An atom is associated with an atom type that dictates how data within the atom is structured. An atom may include one or more nested atoms included as the payload data of the outer atom. Video files structured with atoms provide flexibility to accommodate various types of data and video file options while reducing or substantially eliminating null data for unused video file options and data types.

The video data 230 contains a representation of a video such as video frames. Video data 230 may be in a raw (as captured) or compressed format using spatial or temporal correlations. In one embodiment, video data 230 is stored as a sequence of video frames. When temporally compressed, video frames may be stored as intra-coded frames (i-frames) or inter coded frames (inter frames). An i-frame is a video frame that may be rendered without reference to a temporally proximate frame. A temporally proximate frame is an adjacent frame or any frame that is not more temporally distant from the frame than the immediately previous or immediately following i-frame. In contrast, inter coded frames are rendered based on changes to a temporally proximate frame. For example, a predictive frame (p-frame) includes image data specified relative to a temporally adjacent frame, and a bidirectional frame (b-frame) includes image data interpolated from temporally adjacent frames.

The audio data 240 contains a representation of audio data in a raw (as captured) or compressed format. Example audio data 240 may be compressed by lossy or lossless methods. In some file formats, audio data 240 is compressed in parallel with the video data 230. The audio-video sync data 250 indicates relative timing between the video data 230 and audio data 240 for playback. Some file formats obviate audio-video synchronization data 250.

The video header 220 describes the layout of data within the video file 210 through references to different portions of the video. In one example file format, the video header 220 includes an identifier string declaring that the data following the identifier string is part of the video header 220. The beginning of the video header 220 may also include a size parameter indicating how much data the video header 220 includes (and accordingly an index of where data included in the video header 220 ends). Following the beginning of the video header 220 is the payload (i.e., the remaining data in the video header 220). The example video header 220 includes a data index 224 and video attributes 222.

The data index 224 contains references to the video file 210 payload, which refers to data in the video file 210 besides data in the video header 220 (e.g., the video data 230, the audio data 240, and the audio-video synchronization data 250). Example references include pointers relative to a start bit of the video file 210 (e.g., an index) and pointers to a memory location. In some embodiments, the data index 224 includes references to chapters or other breakpoints within the video data 230. The data index 224 may also include references to lower-level breakpoints used in video processing operations such as rendering and transcoding. For example, the data index 224 includes references to i-frames within the video data 230. In other embodiments, the video data 230 includes a separate header with references to i-frames or other video frames, and the video header 220 instead includes a reference to the header of the video data 230.

The video attributes 222 include intrinsic metadata describing the video file 210. Examples of intrinsic metadata include descriptive information such as titles (e.g., overall title, chapter titles), temporal information (e.g., time of creation, time of most recent edit, overall duration), chapter structure (e.g., times or references to chapter breaks), or playback settings (e.g., audio settings such as default volume, display settings such as brightness). Relational metadata describe the video's relationship to other entities and include grouping information (e.g., video collection or series titles) or associated users (e.g., creator, owner, editor), for example. Contextual metadata describe the environment where the video was captured or created and include sensor measurements (e.g., from a gyroscope or accelerometer) or highlight tags. Any of the video attributes 222 may be separate from the video header 220. For example, some of the video attributes 222 are contained in a separate atom references by the video header 220.

Highlight tags indicate video portions of interest (e.g., a scene of interest, an event of interest). Besides indicating a time within a video (or a portion of time within the video) corresponding to the video portion of interest, a highlight tag may also indicate a classification of the moment of interest (e.g., an event type, an activity type, a scene classification type). Video portions of interest may be identified according to an analysis of quantitative metadata (e.g., speed, acceleration), manually identified (e.g., by a user through a video editor program), or a combination thereof. For example, a camera records a user tagging a moment of interest in a video through recording audio of a particular voice command, recording one or more images of a gesture command, or receiving selection through an input interface of the camera 110. As another example, a video portion of interest is identified by comparing quantitative metadata (e.g., from sensor measurements, from video image analysis) to a one-sided or two-sided threshold based on one dimension of metadata or to a condition based on multiple dimensions of metadata. For instance, acceleration metadata above a threshold may indicate a crash event, particularly in the context of sport label metadata indicating that the video depicts skiing.

Example Media Extractor

Figure 3:
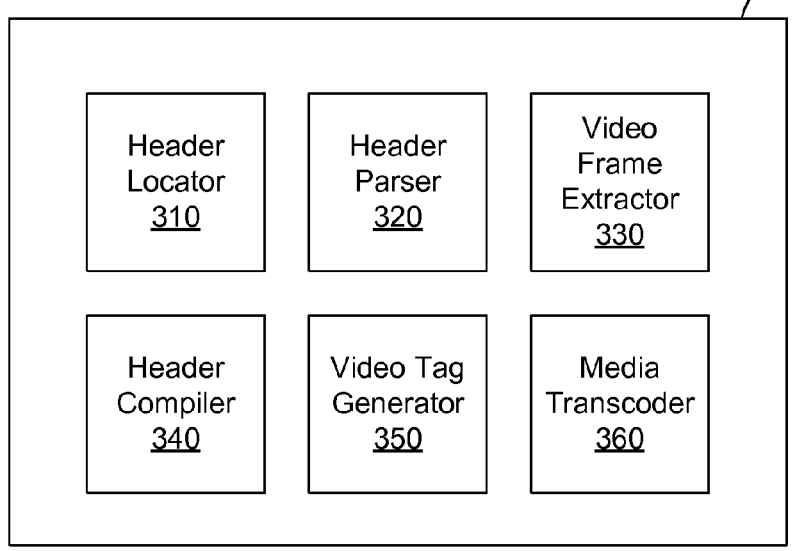
FIG. 3 is a block diagram of a media extractor module, according to one example embodiment.

FIG. 3 is a block diagram of the media extractor 146, according to one example embodiment. The media extractor 146 includes a header locator 310, a header parser 320, a video frame extractor 330, a header compiler 340, a video tag generator 350, and a media transcoder 360. In other embodiments, the media extractor 146 may include additional, fewer, or different components for performing the functionalities described herein.

The header locator 310 obtains a reference to a video file and identifies the video header from the video file. The reference to a video file may be a file location in the local store 142 or a URL corresponding to the video file in the media store 124. The header locator 310 retrieves a subset of the video file from a file index range conventionally including the video header. For example, the conventional index range is the first 200 kb (kilobytes) of the video file. As another example, the file index range is the last part of the video file. The header locator 310 identifies the video header by searching the obtained subset of the video file for a header label declaring the header portion. For example, the header label declaring the header portion is a pre-determined string (e.g., "moov").

In some embodiments where the video file has multiple index ranges conventionally including the video header, the header locator 310 obtains a first subset corresponding to a first index range and searches for the video header within the first subset. If the first subset does not include the video header, then the header locator sequentially obtains additional subsets and searches them until the video header is identified. Thus, the header locator 310 retrieves the video header without loading the entire video file into memory. If the entire video file (e.g., 4 GB of data) were loaded into memory, the web browser 144 would exceed memory allocated by the operating system and crash. Thus, the header locator 310 beneficially reduces crashes by the web browser 144.

The header parser 320 obtains a reference to the video header and obtains references to video frames within the video header. The header parser 320 determines the last index of the video header. The last index of the video header may be determined by identifying the size of the video header and summing the size of the video header with the one less than the first index indicating the beginning of the video header. For example, the size of the video header may be conventionally located at the beginning of video header adjacent to the header label. The header parser 320 parses the video header after ensuring that the video file is loaded from the first index to the last index. The parsing is done according to a convention for the structure of data within the video header. By parsing the video header, the header parser 320 may obtain references to video frames. For example, the header parser 320 determines index values of the beginnings of video frames within the video file.

The video frame extractor 330 obtains the selection of the video portion and uses the parsed video header to load a truncated video portion. The truncated video portion includes the selected video portion and a portion of the video contiguous to the selected video portion. The contiguous portion is used to render the selected video portion, which is not reconstructable without the contiguous video portion. In one embodiment, the video frame extractor 330 identifies inter frames within the selected video portion that are rendered using i-frames outside the selected video portion. The video frame extractor 330 determines the video index range for the truncated portion to span from the first i-frame used to reconstruct the selected video portion to the last i-frame used to reconstruct the selected video portion.

For example, the video frame extractor 330 determines whether inter frames before the first i-frame in the selected video portion depend on a previous i-frame before a first frame of the selected video portion. If one or more of the inter frames does depend on the previous i-frame outside the selected video portion, then the video frame extractor 330 determines the first index of the truncated video portion from the index of the previous i-frame. If the one or more inter frames do not depend on the previous i-frame, then the first index in the truncated video portion is the index of the first frame within the selected video portion. The video frame extractor 330 may apply a similar process to determine the last index of the truncated video portion. Using the determined index range, the video frame extractor 330 retrieves the truncated video portion from the local store 142 or the media store 124 and loads the truncated video portion into memory allocated to executing the web browser 144. By identifying the truncated video portion relevant to reconstructing the selected video portion, the video frame extractor 330 beneficially reduces the bandwidth, memory, and processing resources to load the video file. For example, the video file is 4 GB, but the truncated video file is 50 MB, for a saving of six orders of base-two magnitude. Determination of the index range is described further with respect to FIG. 5.

The header compiler 340 generates a truncated video header for the truncated video portion. In one embodiment, the header compiler 340 modifies the initial video header by re-indexing the references to video frames. For example, the header compiler 340 removes references to video frames outside of the truncated video portion and re-indexes references to video frames included in the truncated video portion. The header compiler 340 may also update the size of the truncated header to match the size of the truncated video portion and retain other portions of the video header (e.g., metadata). The header compiler 340 may add additional metadata describing the media extraction (e.g., time, data, username, unique identifier of the initial video file).

The video tag generator 350 encodes the truncated video portion and the truncated video header as a video tag in the video editing interface 116. The video tag generator 350 combines the video header and the truncated video portion into a truncated video file. If the video file includes sound data and the media output type is a video clip or audio clip (rather than an image), then the video tag generator 350 includes the sound data corresponding to the truncated video portion in the truncated video file. The video file is encoded as a data URI (or URL) within the video tag. A data URI refers to a URI that contains data used in place of a reference to that data. For example, a video tag in a canvas HTML element specifies a source of the video. Although typically the source is a reference to the video (e.g., the video's URL), the source can instead be a data URI. The video file may be encoded in the data URI as a binary string, for example. By encoding the truncated video file as a data URI, the video tag generator 350 masks the origin of the video. The video tag complies with cross-origin resource sharing policies because the video's origin becomes the same as the media server 110 even though the video originated from the CDN 120 or the local storage 142. Embedding a HDHF video as a data URI may not be feasible because some web browsers 144 limit the size of data URIs, but truncating the video file beneficially mitigates this compatibility issue.

The video transcoder 360 takes as input the truncated video file, a specified output format, and an identification of the selected video portion. The video transcoder 360 generates the media depicting the selected video portion in the selected output format. Transcoding (or performing a transcoding operation) refers to converting the encoding of media from one format to another. The specified output format indicates a type of media (e.g., video, audio, or image), a fidelity (e.g., resolution, frame rate, sample rate), and/or a file format. The video transcoder 360 identifies one or more video frames of the selected video portion and reconstructs the one or more video frames—one or more of which may be reconstructed with the portion of the truncated video file outside of the selected video portion. Example video transcoders 360 include FFmpeg, which may be used to transcode mp4 files.

In some embodiments, the extracted media is a summary video comprising multiple non-contiguous video portions of the initial video file. The constituent video portions included in the video summary may be stitched together by the video transcoder 360 (after being encoded as separate data URIs) or may be combined by the video tag generator 350 and encoded in one data URI.

Media Extraction

Figure 4:
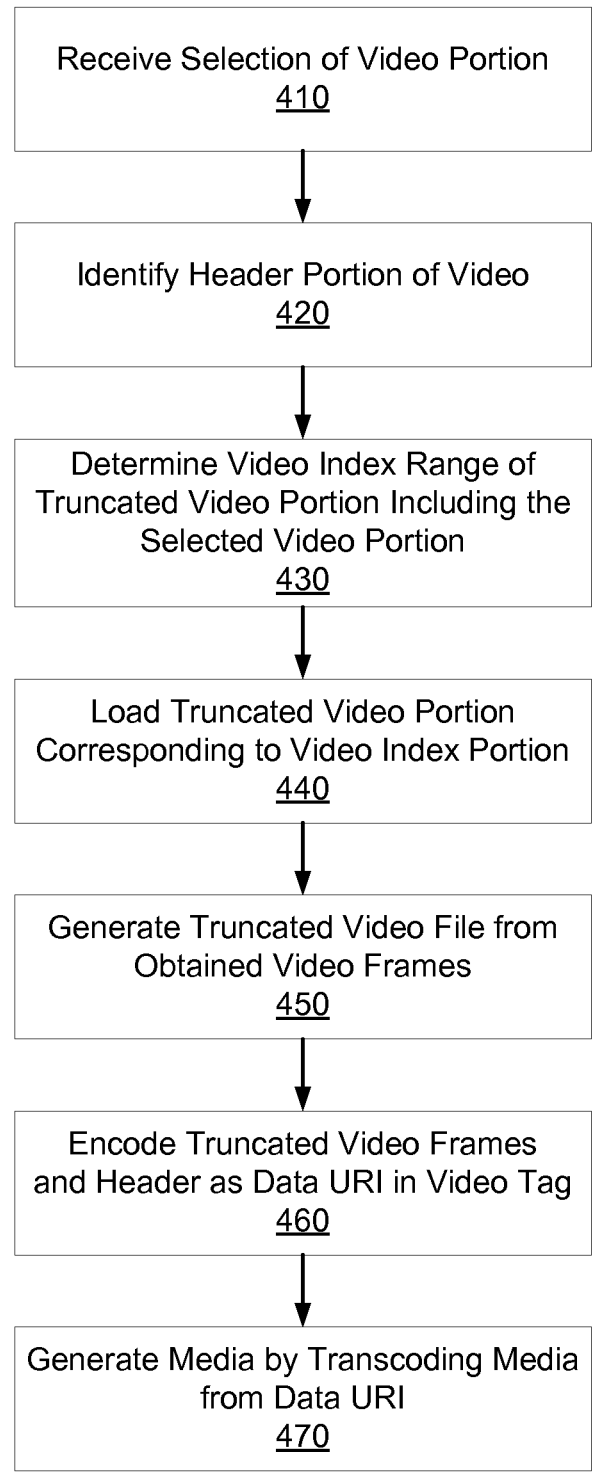
FIG. 4 is a flowchart illustrating extraction of media from a portion of a video, according to one example embodiment.

FIG. 4 is a flowchart illustrating extraction of media from a portion of a video, according to one example embodiment. Different embodiments may include additional or fewer steps in a different order than that described herein.

Using the web browser 144, a user accesses a web application generated by the video editing interface 116. The video is obtained from a video source (e.g., the media store 124 or the local store 142), which has a different domain from a media server 110 providing the web application. The media extractor 146 obtains 410 a selection of a video portion. For example, the selection specifies a time or range of times within the video.

The header locator 310 identifies 420 a header portion from a video file stored in the video source. The header portion indicates index values within the video file of frames within the video. For example, the header locator 310 obtains a subset of the video file from a file index range conventionally including the header portion and identifies 420 the header portion from the subset of the video file by searching for a label declaring the header portion.

The video frame extractor 330 determines 430, from the parsed header portion, a video index range corresponding to the truncated video portion including the selected video portion and the contiguous video portion. For example, the video frame extractor 330 identifies an inter coded frame within the selected video portion that is rendered using an infra-coded frame within the contiguous video portion. The video frame extractor 330 then determines 430 the video index range that includes the identified infra-coded frame within the contiguous video portion and the frames within the selected video portion.

The media extractor loads 440 a truncated video portion into memory allocated to executing the browser. The truncated video portion includes the selected video portion and a video portion contiguous to the selected video portion. The truncated video portion is loaded 440 using the video index range.

The media extractor 146 generates 450 a truncated video file comprising the truncated video portion and a truncated video header indicating index values within the truncated video file of frames within the video. For example, the truncated video header is generated 450 by re-indexing references to video frames included in the truncated video portion and modifying the size.

The video tag generator 350 encodes 460 the truncated video file in a video tag included in the web application. For example, the truncated video file is encoded 460 in binary as a data uniform resource identifier included in the video tag included in the web application.

The media transcoder 360 generates 470 the media corresponding to the selected video portion by transcoding the media from the truncated video file in the video tag. The generated media may be stored in the local store 142 or uploaded to the media server 110 or the CDN 120. If the extracted media is an image, the image may be uploaded as a preview image associated with the video on the media server 110. Alternatively or additionally, the media extractor 146 is a module on the media server 110, and the extracted media is uploaded to the CDN 120 or provided to a client device 130.

Truncated Portion Identification

Figure 5:
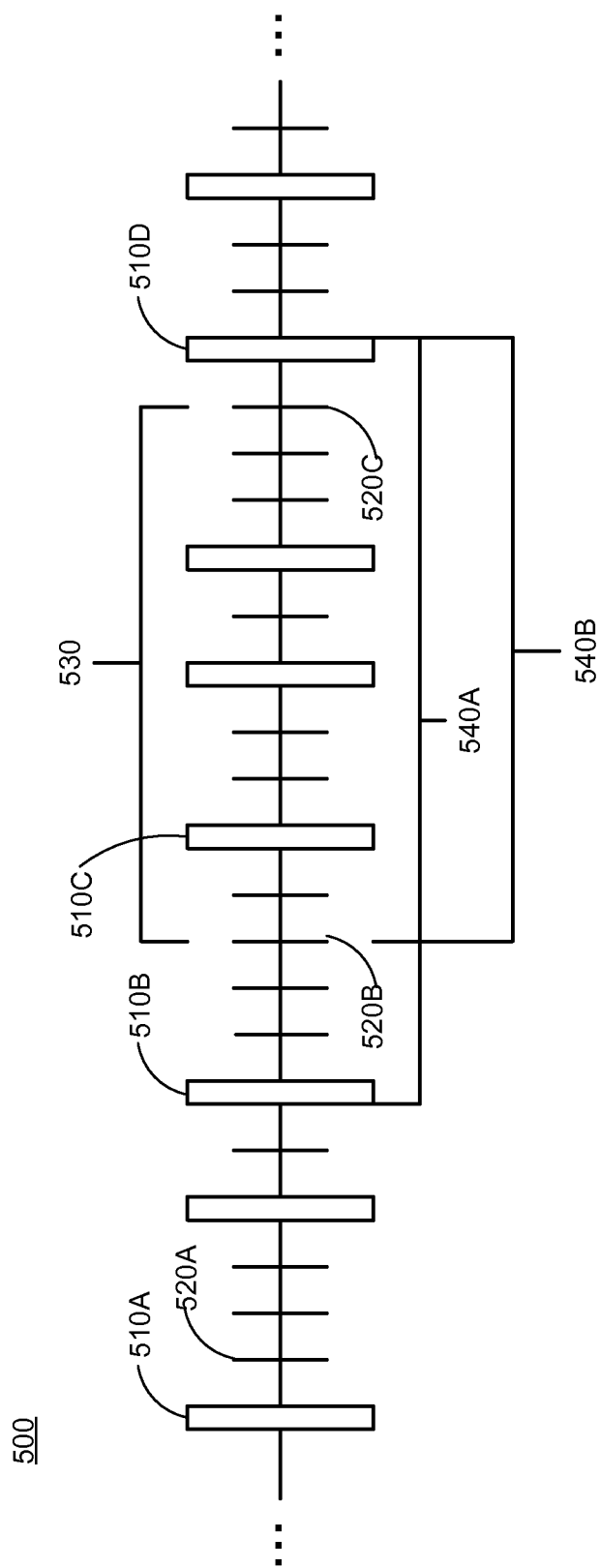
FIG. 5 is a conceptual diagram illustrating the truncated and selected portions of a video file, according to one example embodiment.

FIG. 5 is a conceptual diagram illustrating the truncated and selected portions of a video file 500, according to one example embodiment. The video file includes i-frames 510A-510D (referred to in general as i-frames 510) and inter frames 520A-520C (referred to in general as inter frames 520, e.g., p-frames or b-frames). An inter frame 520 includes direct or indirect dependency on a temporally proximate i-frame 510 before or after the inter frame. The selected video portion 530 includes eight inter frames 520 and three i-frames 510.

Two alternative truncated video portions 540A and 540B (referred to in general as truncated video portions 540) are illustrated. When determining the truncated video portion 540, the video frame extractor 330 determines whether the outer inter frames 520 of the selected portion 530 are dependent on an i-frame 510 outside of the selected video portion 530. The outer inter fames 520 refer to those inter frames before the first i-frame 510 and after the last i-frame 510 in the selected video portion 530. In the illustrated example, the inter frame 520C is dependent on the i-frame 510D, so the truncated video portions 540A and 540B include the i-frame 510D as a portion contiguous to the selected video portion 530. Accordingly, the last index value of the truncated video portions 540A and 540B is the last bit of data included in the i-frame 510D.

The first index value of the truncated video portion depends in part on the dependency of inter frame 520B. If the inter frame 520B is dependent on i-frame 510C, then the video extractor 330 determines that the first index value of the truncated video portion is the first bit of data included in the inter frame 520B. If the inter frame 520B is dependent on i-frame 510B, then the video extractor 330 determines that the first index value of the truncated video portion is the first bit of data included in the i-frame 510B.

Media Extraction from a Local Video

Figure 6:
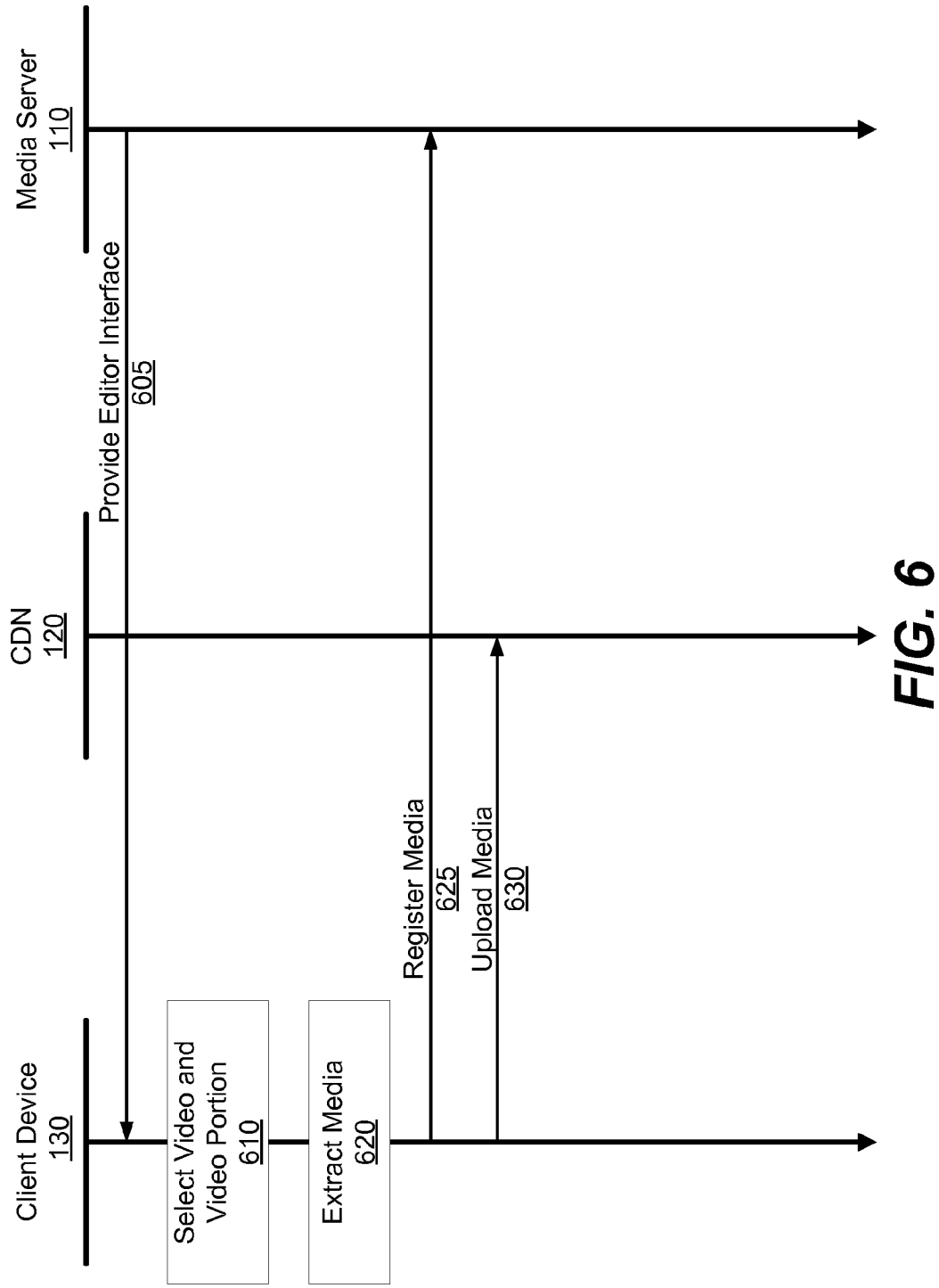
FIG. 6 is an interaction diagram illustrating extraction of media from a video file stored on a client device, according to one example embodiment.

FIG. 6 is an interaction diagram illustrating extraction of media from a video file stored on a client device, according to one example embodiment. Different embodiments may include additional or fewer steps in a different order than that described herein.

The media server 110 provides 605 an editor interface (e.g., by the video editing interface 116) to the client device 130. The editor interface may be a web browser or an application native to the operating system of the client device 130. Through the editor interface, the user selects a video in the local store 142 (or in a communicatively coupled device such as a camera). The user also inputs a selected portion of the video (e.g., a video time) and commands the editor interface to extract the media. The editor interface may include options for selecting the type and format of the extracted media.

Using the specified options, the media extractor 146 extracts 620 the media. In the absence of user-specified options, the media extractor 146 may use default formatting or fidelity options. The client device 130 registers 625 the media with the media server 110 and uploads 630 the media to the CDN 120. Registering the media refers to sending metadata to the media server 110, which may assign a unique identifier and provide instructions for uploading the media (e.g., a URL to the CDN). Alternatively or additionally, the media is uploaded to the media server 110.

Media Extraction from a CDN-Stored Video

Figure 7:
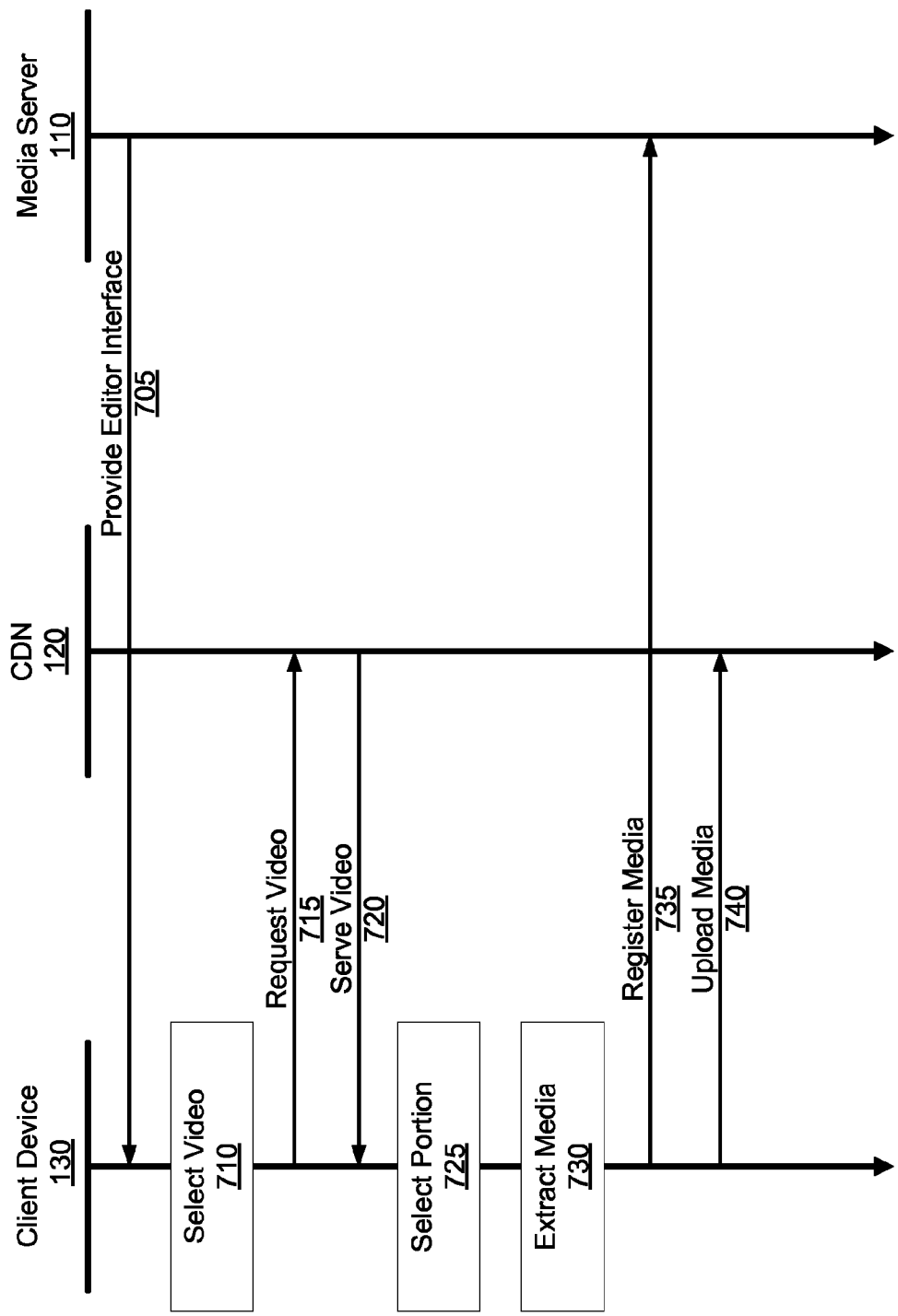
FIG. 7 is an interaction diagram illustrating extraction of media from a video file stored on a content distribution network, according to one example embodiment.

FIG. 7 is an interaction diagram illustrating extraction of media from a video file stored on a content distribution network, according to one example embodiment. Different embodiments may include additional or fewer steps in a different order than that described herein.

The media server 110 provides 705 an editor interface (e.g., by the video editing interface 116) to the client device 130. The editor interface may be a web browser or an application native to the operating system of the client device 130. Through the editor interface, the user selects 710 a video in the media store 124. The client device 130 requests 715 the video from the CDN 120, which serves 720 (e.g., as a stream, as a download) the video to the client device 130. The user selects 725 a portion of the video (e.g., a video time) and commands the editor interface to extract the media. For example, the user pauses the video and instructs the editor interface to generate a thumbnail or preview image of the time at which the user paused. The editor interface may include options for selecting the type and format of the extracted media.

Using the specified options, the media extractor 146 extracts 730 the media. The client device 130 registers 735 the media with the media server 110 and uploads 740 the media to the CDN 120. Alternatively or additionally, the media is uploaded to the media server 110. Registering the media refers to sending metadata to the media server 110, which may assign a unique identifier and provide instructions for uploading the media.

Media Extraction from at a Video Server

Figure 8:
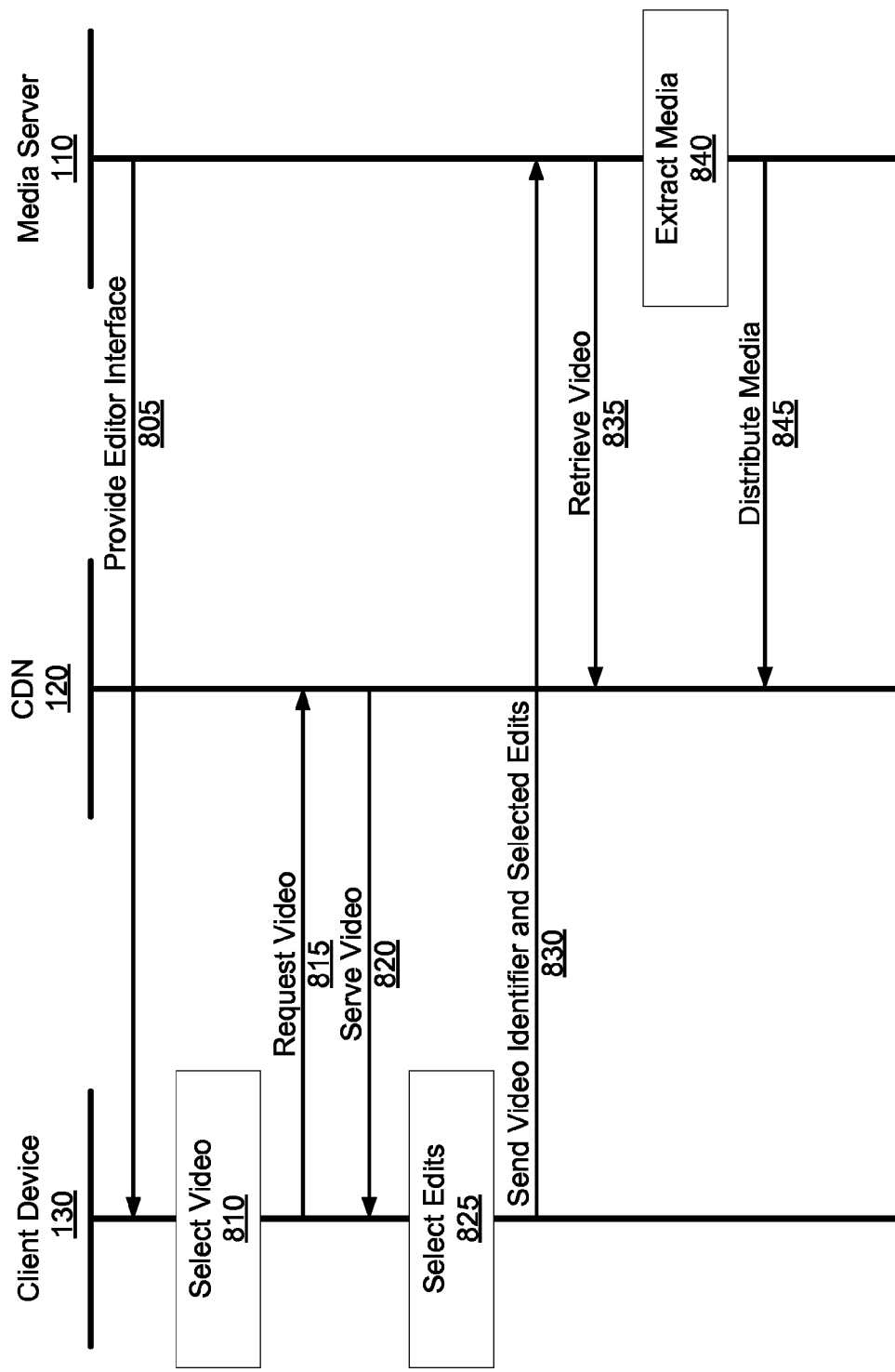
FIG. 8 is an interaction diagram illustrating extraction of media from a video file by a media server, according to one example embodiment.

FIG. 8 is an interaction diagram illustrating extraction of media from a video file by a media server, according to one example embodiment. Different embodiments may include additional or fewer steps in a different order than that described herein.

The media server 110 provides 805 an editor interface (e.g., by the video editing interface 116) to the client device 130. The editor interface may be a web browser or an application native to the operating system of the client device 130. Through the editor interface, the user selects 810 a video in the media store 124, the local store 142, or a communicatively coupled device such as a camera. The client device 130 requests 815 the video from the CDN 120, which serves 820 (e.g., as a stream, as a download) the video to the client device 130. The user selects 825 a portion of the video (e.g., a video time) and commands the editor interface to extract the media. For example, the user selects one or more time ranges within the video to use as a summary video. The editor interface may include options for selecting the type and format of the extracted media.

The client device 130 sends 830 a video identifier of the video and a description of the selected portions (e.g., an edit decision list) to the media server 110. The media server 110 retrieves 835 the video corresponding to the video identifier from the CDN 120 (or from the client device 130). Using the options specified in the edit decision list, a media extractor 146 on the media server 110 extracts 840 the media. The media server 110 distributes 845 the media through the CDN 120. When extraction is done on the media server 110, the disclosed embodiments beneficially reduce consumption of processing and memory resources even in the absence of constraints on cross-origin resource sharing.

Alternatively or additionally to extracting media according to edits input by a user through a client device 130, the media server 110 generates the edits (and selects the video portion) automatically. For example, the media server 110 selects one or more video portions according to video metadata such as sensor measurements or according to automatically generated or user-generated highlight or event tags. The media server 110 extracts 840 the media by generating a summary video including the one or more selected video portions.

Additional Configuration Considerations

The disclosed embodiments beneficially reduce memory and processing resource consumption by the web browser 144 by parsing the video file header without loading the entire video file into memory. The disclosed embodiments also reduce processing and memory resources consumed by transcoding the video because the truncated video file is transcoded rather than the entire video file. This reduces memory consumption by the web browser 144 and to avoid exceeding the memory allocated to the web browser and causing a crash Embedding the truncated video file as a data URI beneficially ensures compliance with cross-resource sharing policies, ensuring compatibility with CDNs having a different domain than the media server 110.

Certain embodiments are described herein as including logic or a number of components, modules, or mechanisms, for example, as illustrated in FIGS. 1 and 3. Modules may constitute software modules (e.g., code embodied on a machine-readable medium or in a transmission signal), hardware modules, or a combination thereof. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for efficient media extraction. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A non-transitory computer-readable medium comprising instructions for extracting media from a portion of a video, the instructions executable to cause a processor to:
    present the video through a web application accessed by a browser of a client device, the video obtained from a video source having a first domain that is different from a second domain of a media server providing the web application accessed by the browser such that the video obtained from the video source does not comply with a cross-origin resource sharing policy enforced by the media server;
    receive a selection of a video portion of the video;
    obtain a header portion from a video file comprising the video, the video file stored in the video source, the header portion indicating index values within the video file of frames within the video;
    load a truncated video portion into client device memory allocated to executing the browser, the truncated video portion including the selected video portion and a video portion contiguous to the selected video portion;
    generate, at the client device, a truncated video file comprising the truncated video portion and a truncated video header indicating shifted index values within the truncated video file of frames within the video;
    encode, at the client device, the truncated video file into a video tag included in the web application to mask the first domain of the video source such that the encoded truncated video file complies with the cross-origin resource sharing policy of the media server; and
    generate, at the client device, the media corresponding to the selected video portion by transcoding the media from the truncated video file encoded into the video tag.

2. The computer-readable medium of claim 1, wherein instructions to obtain the header portion comprise instructions to cause the processor to:
    obtain a subset of the video file from a file index range conventionally including the header portion; and
    identify the header portion from the subset of the video file by searching for a label declaring the header portion.

3. The computer-readable medium of claim 1, wherein instructions to load the truncated video portion comprise instructions to cause the processor to:
    determine, by parsing the header portion, a video index range corresponding to the truncated video portion including the selected video portion and the contiguous video portion; and
    load the truncated video portion into memory allocated to executing the browser by retrieving the video portion from the video source using the video index range, the truncated video portion including the selected video portion.

4. The computer-readable medium of claim 3, wherein instructions to determine the video index range comprise instructions to cause the processor to:
    identify an inter coded frame within the selected video portion that is rendered using an infra-coded frame within the contiguous video portion; and
    determine the video index range to comprise the frames within the selected video portion and the identified infra-coded frame within the contiguous video portion.

5. The computer-readable medium of claim 1, wherein instructions to generate the truncated video file comprise instructions to cause the processor to generate the truncated video header by re-indexing references to video frames included in the truncated video portion.

6. The computer-readable medium of claim 1, wherein instructions to encode the truncated video file in the video tag included in the web application comprise instructions to cause the processor to encode the truncated video file in binary as a data uniform resource identifier included in the video tag included in the web application.

7. The computer-readable medium of claim 1, wherein the data source is one of a content distribution network with a separate domain from the media server or a file store on the client device.

8. The computer-readable medium of claim 1, wherein the extracted media is a thumbnail image and the selected video portion is a video frame, the method further comprising uploading the thumbnail image to the video server as a preview image associated with the video.

9. The computer-readable medium of claim 1, wherein the extracted media is a video clip comprising multiple video frames, wherein instructions to generate the truncated video file comprise instructions to cause the processor to:
    obtain a truncated sound portion corresponding to the truncated video portion; and
    generate the truncated video file comprising the truncated video portion, the truncated video header, and the truncated sound portion.

10. The computer-readable medium of claim 9, wherein instructions to obtain the sound portion comprise instructions to cause the processor to:
    determine, by parsing the header portion, a sound index range corresponding to the truncated sound portion captured concurrently with the truncated video portion; and load the truncated sound portion into the memory allocated to executing the browser by retrieving the truncated sound portion from the video source using the sound index range.

11. A method for extracting media from a portion of a video, the method comprising:
receiving a selection of a video portion of the video through a web application accessed by a browser, the web application being provided by a media server;
identifying a header portion from a video file comprising the video, the video file stored in a video source, the video source having a first domain that is different from a second domain of the media server such that the video file obtained from the video source does not comply with a cross-origin resource sharing policy enforced by the media server, the header portion indicating index values within the video file of frames within the video;
loading a truncated video portion including the selected video portion and a video portion contiguous to the selected video portion;
generating a truncated video file comprising the truncated video portion and a truncated video header indicating shifted index values within the truncated video file of frames within the video;
encoding the truncated video file into a video tag to mask the first domain of the video source such that the encoded truncated video file complies with the cross-origin resource sharing policy of the media server; and
generating, by a processor, the media corresponding to the selected video portion by transcoding the media from the truncated video file encoded into the video tag.

12. The method of claim 11, wherein identifying the header portion comprises:
obtaining a subset of the video file from a file index range conventionally including the header portion; and
identifying the header portion from the subset of the video file by searching for a label declaring the header portion.

13. The method of claim 11, wherein loading the truncated video portion comprises:
determining, by parsing the header portion, a video index range corresponding to the truncated video portion including the selected video portion and the contiguous video portion; and
loading the truncated video portion into memory allocated to executing the browser by retrieving the video portion from the video source using the video index range, the truncated video portion including the selected video portion.

14. The method of claim 11, wherein generating the truncated video file comprises generating the truncated video header by re-indexing references to video frames included in the truncated video portion.

15. The method of claim 11, wherein the extracted media is a video clip comprising multiple video frames, wherein generating the truncated video file comprises:
obtaining a truncated sound portion corresponding to the truncated video file; and
generating the truncated video file comprising the truncated video portion, the truncated video header, and the truncated sound portion.

16. A non-transitory computer-readable medium storing instructions that when executed cause a processor to:
receive a selection of a video portion of a video through a web application accessed by a browser, the web application being provided by a media server;
identify a header portion from a video file comprising the video, the video file stored in a video source, the video source having a first domain that is different from a second domain of the media server such that the video file obtained from the video source does not comply with a cross-origin resource sharing policy enforced by the media server, the header portion indicating index values within the video file of frames within the video;
load a truncated video portion including the selected video portion and a video portion contiguous to the selected video portion;
generate a truncated video file comprising the truncated video portion and a truncated video header indicating shifted index values within the truncated video file of frames within the video;
encode the truncated video file into a video tag to mask the first domain of the video source such that the encoded truncated video file complies with the cross-origin resource sharing policy of the media server; and
generate media corresponding to the selected video portion by transcoding the media from the truncated video file encoded into the video tag.

17. The computer-readable medium of claim 16, wherein instructions to identify the header portion comprise instructions to cause the processor to:
obtain a subset of the video file from a file index range conventionally including the header portion; and
identify the header portion from the subset of the video file by searching for a label declaring the header portion.

18. The computer-readable medium of claim 16, wherein instructions to load the truncated video portion comprise instructions to cause the processor to:
determine, by parsing the header portion, a video index range corresponding to the truncated video portion including the selected video portion and the contiguous video portion; and
load the truncated video portion into memory allocated to executing the browser by retrieving the video portion from the video source using the video index range, the truncated video portion including the selected video portion.

19. The computer-readable medium of claim 16, wherein instructions to generate the truncated video file comprise instructions to cause the processor to generate the truncated video header by re-indexing references to video frames included in the truncated video portion.

20. The computer-readable medium of claim 16, wherein the extracted media is a video clip comprising multiple video frames, wherein instructions to generate the truncated video file comprise instructions to cause the processor to:
obtain a truncated sound portion corresponding to the truncated video file; and
generate the truncated video file comprising the truncated video portion, the truncated video header, and the truncated sound portion.

* * * * *